United States Patent [19]
Goodman et al.

[11] Patent Number: 5,159,499
[45] Date of Patent: Oct. 27, 1992

[54] LOGGING CABLE MAGNETIC REMARK APPARATUS

[75] Inventors: Kenneth R. Goodman, LaPorte; Peter W. Sauermilch, Sugar Land, both of Tex.

[73] Assignee: Halliburton Logging Services, Inc., Houston, Tex.

[21] Appl. No.: 437,862

[22] Filed: Nov. 17, 1989

[51] Int. Cl.$^5$ .......................... G11B 5/00; G01D 9/00
[52] U.S. Cl. .................................. 360/1; 346/33 WL
[58] Field of Search ................. 360/1, 6, 54; 346/7, 346/33 WL, 33 M

[56] References Cited

U.S. PATENT DOCUMENTS

| | | | |
|---|---|---|---|
| 3,066,253 | 11/1962 | Bowers | 324/34 |
| 3,566,478 | 3/1971 | Hurlston | 33/142 |
| 3,978,588 | 9/1976 | Richardson et al. | 33/126.5 |
| 4,190,868 | 2/1980 | Moulin | 360/1 |

Primary Examiner—Aristotelis Psitos
Assistant Examiner—Won Tae C. Kim
Attorney, Agent, or Firm—William J. Beard

[57] ABSTRACT

A magnetic mark on a cable is subject to loss of intensity. The present disclosure provides for remarking. It utilizes a detector which responds to passage of a magnetic mark on the cable. A coil for remarking is located at a specified and measured distance from the detector. Through the use of measuring wheels in contact with the cable providing data to a computer, the cable traverses from the detector to the marking coil, and a marker control circuit is timely operated to place a new mark on the cable. The new mark is placed coincident over the prior mark and has greater intensity to renew the magnetic marks on the cable.

13 Claims, 1 Drawing Sheet

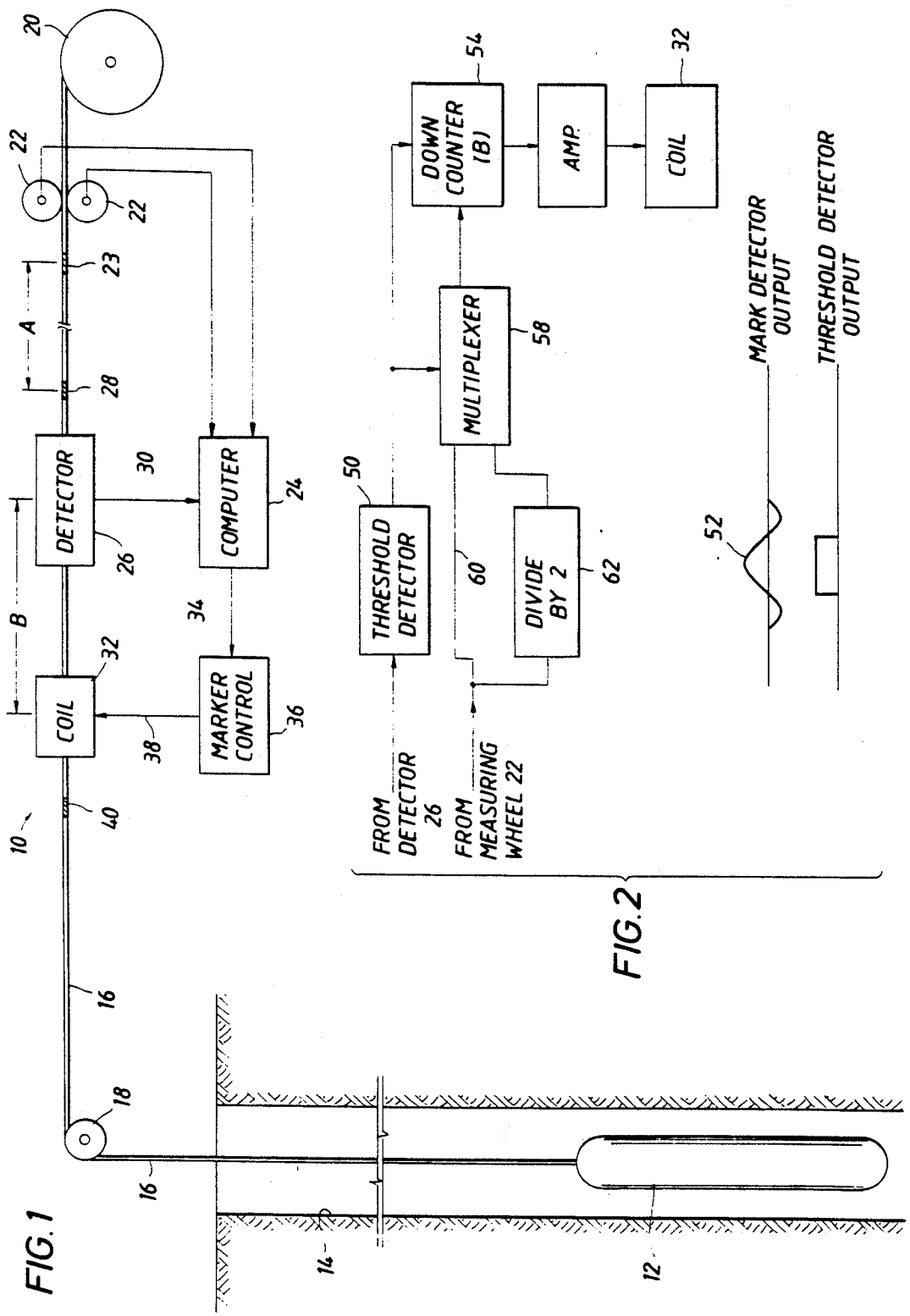

LOGGING CABLE MAGNETIC REMARK APPARATUS

BACKGROUND OF THE DISCLOSURE

Logging tools are lowered into a well on a logging cable. The cable typically includes one or more electrical conductors extending from the logging tool in the sonde (one or more tools) to the end of the cable which is typically stored on a drum or reel for convenience in handling. The logging cable typically has a strong member which is a type of woven wire rope. The length of the cable is an important factor to enable depths or locations of measurements to be determined by the sonde in the borehole. Thus, a particular reading must be located vertically so that the reading can be correlated with other data to associate the data with particular formations which are intercepted by the borehole. One technique for increasing the precision of this measurement is to place magnetic marks on the cable at specified locations. Magnetic marks typically are placed on the cable by magnetizing the ferrous material comprising the cable. Ordinarily, the magnetic marks are placed at calibrated distances along the cable.

A magnetic mark is placed by magnetizing that portion of the cable to create a magnetic mark. The mark is detected by a detection device which is held adjacent to the cable as it moves past which forms an output pulse from the device. The pulse is indicative of the passage of the magnetic mark. This works quite well as long as the magnetic mark has a specified magnetic intensity or strength. However, the magnetic marks tend to wear by loss of intensity. Several factors contribute to the loss of intensity. One is the mere passage of time, but perhaps the more important factors involved are continual passage of the marked portion of the logging cable over the sheave. Another factor is prior magnetization of the casing or wellhead equipment, whether intentional or accidental. In addition, the magnetic marks on the cable are stored in tightly wound bights on the reel, and marks stored adjacent to one another tend to reduce mark intensity. Accordingly, the marks on the cable become weaker and weaker. Ultimately, they become so weak that they can no longer be detected, or at least several marks of the cable become so weak that the entire cable must be removed and remarked. Remarking is easily described but is an expensive process to carry out. It is quite difficult to accomplish in the field. Normally, it requires that the cable be removed from the field location (whether onshore or offshore) and transferred with the storage reel to a remarking location. The remarking equipment requires a mechanism for magnetizing the cable. In addition, it requires a measuring apparatus which carefully calibrates the distance between adjacent marks. The strong marks are placed on the cable only after precise measurement. The first step, however, is erasing all prior marks. This is accomplished simply by exposing the entire cable to an oscillatory magnetic field which destroys the preexistent marks. Remeasuring then positions the new set of marks. The new marks are simply placed on the cable in the same fashion as would occur with a new cable.

The remarking procedure presently used thus requires transportation of the cable and associated reel, thereby taking the cable out of service. This is disruptive to field operations, and is a time consuming process which is therefore relatively expensive. In particular, this derives from the necessity of remeasuring the cable to locate the marks. This must be accomplished with the cable held at a specified tension or load. The materials comprising the cable stretch or elongate in the elastic range. Accordingly, the marks must be placed on the cable with a specified or known tension. Accordingly, the presently used remarking procedure involves precise measurements of cable tension and distance between marks. It is desirable that the marks be placed on the cable with an accuracy which approaches about one eighth inch between marks which are normally one hundred feet apart. In other words, the measurement is accurate to approximately one part per ten thousand between marks. While this accuracy can be obtained, it is nevertheless obtained with substantial time, effort and resultant cost.

By contrast, the present apparatus and procedure remark the cable by intensifying the prior marks. The prior marks will fade, but they are remarked before they become undetectable. Thus, when the cable has been used sufficiently that the marks are marginally detectable, they are remarked at the same locations. This avoids the necessity of careful measurements. This avoids the necessity of placing the cable under a specified tension during remarking. This is more readily accomplished with equipment in the field, and indeed, the present apparatus has the form of an accessory which can be incorporated with the cable handling equipment so that the cable and drum for storage of the cable do not have to be removed; rather, remarking can occur at the wellhead. It can occur while leaving the cable drum mounted on the skid or other support equipment without any disruption of the equipment and removal from the immediate wellhead vicinity.

Remarking as proposed by the present disclosure involves the use of a set of measuring wheels which are already in place. The measuring wheels enable the cable to be spooled into the borehole while the magnetic marks pass through a detector. The detector forms an output signal having the form of an electrical pulse indicative of magnetic mark passage. That signal is delivered to a marker control circuit. That circuit provides a strong magnetization current flow to a coil positioned around the cable for marking purposes. The magnetic mark formed thereby is controlled in location so that it marks over the prior mark. In other words, as the prior mark traverses through the present apparatus, it is written over, thereby providing a strong mark on the cable using prior mark locations.

The present procedure involves the use of a magnetic mark detector and a magnetic marker. The latter device is a coil provided with a pulsed current flow of sufficient strength. The distance between these two components is measured along the cable passing through and is a distance which can be measured. As the cable traverses the equipment, this distance is also traversed by a mark which is to be remarked, and this distance is measured by the controller circuitry. Remarking is then implemented. Measurements between marks are not required. Calibrated measurements under calibrated tension loads are not required. Rather, the entire procedure is accomplished in the field utilizing the prior marks to locate the new and stronger marks.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 of the drawings shows a logging cable deployed on a storage drum and extending over a sheave for supporting a logging tool in a well borehole, and further illustrates the apparatus of the present disclosure for locating magnetic marks on the cable and providing a timed signal for remarking the cable; and FIG. 2 shows a typical signal and cooperative circuitry to place the remark on the cable.

DETAILED DESCRIPTION OF THE PREFERRED EMBODIMENT

Attention is now directed to FIG. 1 of the drawings. In FIG. 1, the numeral 10 identifies the apparatus of the present disclosure which is particularly adapted for marking a cable used at the intended location, namely for supporting a logging tool in a well borehole. The customary mode of use of the cable will be described first after which the present apparatus will be described.

The numeral 12 identifies a sonde which encloses one or more logging tools adapted to be lowered in a well borehole 14. The borehole may be cased or an open hole as appropriate. The sonde 12 is supported on a logging cable 16 which extends upwardly to the surface and passes over a sheave 18. The cable 16 extends from the sheave to a storage drum 20. The storage drum 20 is a large drum which spools the cable thereon so that the full length of the cable can be stored. The cable can be of any length, typically 20,000 or even 25,000 feet in length to assure logging in deeper wells. The sheave is typically installed at or above the well head and the drum is positioned just a few feet to the side.

The typical equipment involved in logging operations also includes a pair of spaced measuring wheels 22. They are located on opposite sides of the cable to clamp against the cable. The measuring wheels provide output signals as the cable moves through the measuring wheels. The output signals from the cable are provided to a computer 24 which indicates movement of the cable and determines the location of the sonde.

The cable 16 is marked with magnetic marks 28 at a spacing of the distance A as shown in the drawings. This distance is normally one hundred feet. This distance is measured in a very accurate fashion so that the center of each mark is controlled very carefully. The marks are typically placed on the cable under a specified tension and, at that state of elongation, the marks are intended to be 100.00 feet apart measured with an accuracy of about one eight inch or 0.01 foot. The present apparatus utilizes a mark detector 26. The detector 26 recognizes the mark as the cable travels from the spool 20 into the borehole 14. This forms an output signal on the conductor 30 which is input to the computer 30. The present apparatus utilizes a cable marking coil 32; a control signal on a conductor 34 operates a mark control circuit 36. This circuit provides the current pulse on the conductor 38 to the coil 32. That assures marking.

The distance between the detector 26 and the coil 32 is represented by the symbol B. This distance is measured at the particular installation for the present apparatus. Thus, the distance B can be just a few feet, typically about two feet. Ideally, it is a fixed distance that is measured. The distance B that is measured is input to the computer 24. The measuring wheels 22 operate providing a continuous signal of cable deployment. As sufficient cable has been deployed as measured by the measuring wheels 22, that causes the computer to recognize the traverse of this length. The computer 24 responds to the measuring wheels to measure the cable 16 so that the mark passing through the detector 28 arrives at the coil 32 at a known instant. In other words, as cable is spooled from the reel 20 and feeds into the borehole 14, a particular magnetic mark on the cable passes through the detector, travels the distance B and then is located under the coil 32 at a known instant. This distance B is measured by the measuring wheels 22 in conjunction with the computer 24. That distance B is measured by the measuring wheels 22 and a signal is created by the computer 24, output on the conductor 34, applied to the marker control circuit 36 and that circuit forms a current pulse 38 applied to the coil 32. When applied, a magnetic mark is then formed on the cable. The magnetic mark is placed on the cable over the previous mark which was magnetically weak. The new mark is placed on the cable over the old mark. The new magnetic mark is formed by operation of the coil 32 so that the new mark 40 is formed at the location of the old mark 28.

This procedure enables one to remark the entire length of the cable 16, or less as desired. The remarking procedure might even be interrupted. Typically, the marks that fade first are the ones on the cable immediately above the sonde. Typically, this occurs because the entire length of the cable is not unspooled so that marks at the anchored end of the cable encounter less use and are typically stronger marks even though the cable has been used numerous times.

The present remarking procedure involves marking the cable under tension, but there is no requirement that the tension be precisely controlled. If, for instance, the cable is marked in an initial state with a particular load on the cable and hence a particular elastic elongation experienced in the cable, the present procedure does not have to duplicate the intitial condition. Rather, differences in cable elongation can be accommodated. That is, the marks 28 may at a particular tension differ from the initial calibrated measure of 100.00 feet as a result of differences in cable loading. Such differences in tension will cause the cable to elongate to a different length. Even so, that is no detriment, and variations in sonde weight can be readily accommodated.

The method of the present disclosure thus contemplates remarking of the magnetic marks on the cable 16 in its customary mode of use. Thus, the cable need not be removed and is typically remarked while the drum 20 is installed in the ordinary location, the cable passing through the measuring wheels 22 in the ordinary fashion, and extending over the sheave 18 in the customary fashion. This routine operation sets the stage for remarking. Remarking thus requires recognition of the passage of a marginally detectable magnetic mark by the detector 26, measurement of the cable as the distance B traverses the measuring wheels 22 and then formation of a signal from the marker control circuit 36 to be applied to coil 32 for remarking. The remark is placed over the faded mark. The remark 40 shown on the cable 16 is thus located at the desired point on the cable 16. This is done repetitively. As a preliminary step, the distance B must be measured and this value is input to the computer 24 to enable it respond to the dynamic measurements made by the measuring wheels 22.

FIG. 2 shows a typical graph of a detected mark signal. It can be a weak or strong signal and can vary in amplitude and length. It is not uncommon for the magnetic mark to have a length of about two inches on the cable. When remarking is done, it is desirable, whatever the length of the mark, to center the remark in alignment with the old mark. FIG. 2 thus shows how this is implemented with a typical or representative signal amplitude as measured by the detector 26. Obviously, it can have any shape.

The computer 24 thus incorporates a threshold detector 50. It provides an output signal when the input is in excess of a specified threshold. The output signal is exemplified by the output level 52 shown on the irregular graph representative of detected amplitude. That signal is used along with a clock pulse to provide a specified number of pulses to a pulse counter 54. An example of the data stored in the pulse counter will be given. One of the initial measurements is the distance B shown in the drawings. This represents a certain number of pulses. Thus, at a fixed velocity for the the cable, and for a fixed installation of detector 26 spaced from the coil 32, the distance B is fixed and this measurement is input to a counter 54. This is a fixed number so long as the equipment is fixed in length and the speed is held constant. Consider the following example representative of operation. Assume that the distance B is represented by 100 counts. That number is input to the counter 54. Assume further that the threshold interval 52 creates N clock pulses for the pulse counter 54. In other words, the actual mark is six (=N) units in length. The dynamic counter counts to zero and fires the circuit for operation. If the pulse were infinitely narrow (approaching zero in width), then the counter 54 would be operated during cable movement on the passage of 100 counts. This would then provide the properly timed control signal to the circuit 36 as discussed above. In general, the pulse to be recorded has a finite width; in this instance, it is six units in width if N=six. It is desirable to operate the marker control circuit at exactly the mid-point of the time interval 52. There is a tendency for magnetization to spread along the cable. Accordingly, in following this example, the dynamic counter should provide a control signal after 100 counts. In this instance, it is desirable that the total stored in the pulse counter 54 be divided by two to locate the center of the interval 54, and to this end, the counter 54 preferably counts only one half as fast as would otherwise be necessary. Perhaps this will be more clear with another example. Assume for instance that the distance B is represented by 300 counts and the pulse interval is represented by 16 counts. In that instance, the counter should output eight counts (16 divided by 2) which would be deducted from the 300 measurement or would require a total of 292 counts in the counter before the signal is provided to the marker control circuit 36. Again, this assures that the peak is properly centered so that the remark is properly aligned with the prior mark. Should the remark have a width which is greater than zero and this is the practical situation, then the added width will be distributed equally on both sides of the coil so that the new mark is properly aligned with the prior mark. The detector 50 triggers the multiplexer 58 to select pulses input from two sources. One source is the conductor 60 from the measuring wheel 22 for pulse counting. The wheel 22 connects to the conductor 60 which also connects to the pulse divider 62 which divides by two. This implements the mark centering step; the output is input to the multiplexer 58 which delivers the pulses to the counter 54. This counts down from the number of pulses representative of B or 300 in this example. This counter 54 powers the coil 32 through an amplifier.

While the foregoing is directed to the preferred embodiment and sets forth a method and apparatus, the scope of the present disclosure is determined by the claims which follow.

What is claimed is:

1. An apparatus for remarking or reinforcing magnetic marks on a previously magnetically marked logging cable, comprising:
    (a) detector means for detecting passage of a previously marked magnetic mark on a logging cable wherein the cable is extended through said detector means and said detector means forms an output signal indicative of the passage of the previously marked magnetic mark therethrough;
    (b) coil marking means spaced relative to the logging cable and sufficiently close thereto to form a magnetic mark on the cable, and wherein said coil marking means is located a predetermined specified distance from said detector means along the cable; and
    (c) control means provided with measurements of cable travel, wherein said control means in also provided with an input signal from said detector means indicating passage of a previously marked magnetic mark on the cable, and said control means calculates cable traverse over said predetermined specified distance so that said coil marking means is controllably operated to place a magnetic remark on the cable coincident with the previously marked magnetic mark detected by said detector means.

2. The apparatus of claim 1 wherein said coil means comprises a solenoidal coil provided with current flow and forms magnetic flux which is coupled with the cable for marking the cable.

3. The apparatus of claim 1 wherein said control means has cable traverse measuring means connected thereto for determining cable travel over said predetermined specified distance.

4. The apparatus of claim 1 wherein said detector means and coil marking means are installed between a drum storing the cable thereon and a sheave positioned above the well borehole for directing the cable into the borehole.

5. The apparatus of claim 4 wherein said control means has cable traverse measuring means connected thereto for determining cable travel over said predetermined specified distance.

6. The apparatus of claim 5 wherein said cable traverse measuring means includes plural cable measuring wheels contacting the cable.

7. The apparatus of claim 6 including means for computing cable travel, said means for computing being responsive to an output signal from said cable measuring wheel.

8. A method of remarking a logging cable with magnetic marks which comprises the steps of:
    (a) deploying a logging cable between a drum and a sheave supporting that cable for movement therebetween;

(b) locating previously placed magnetic marks along the cable with a locating means;

(c) positioning a coil marking means adjacent to the cable at a known distance from said locating means for remarking on the cable and such that the cable's direction of motion carries a point on the cable past said coil marking means subsequent to passing said locating means;

(d) moving the cable between the sheave and drum to cause a located magnetic mark thereon to pass adjacent to the coil marking means;

(e) calculating cable traverse over said known distance; and (f) operating the coil marking means solely in response to a signal from said locating means and said calculation to form a new magnetic mark coincident with the prior magnetic mark located on the cable.

9. The method of claim 8 including the step of supporting a weight on the cable to provide tension in the cable, and thereafter extending the cable to enable one or more marks on the cable to pass through said locating means for detection.

10. The method of claim 9 including the step of measuring cable movement by contacting a measuring wheel against the cable and forming a signal thereof.

11. The method of claim 10 including the step of locating a previously placed magnetic mark by positioning a mark detector adjacent to the cable to detect mark passage.

12. The method of claim 11 including the step of applying a pulse of current to the coil marking means to form a new mark on the cable.

13. The method of claim 12 including the step of controlling the current pulse relative to the cable by controlling the timing of the pulse in response to said signal generated by said locating means.

* * * * *